United States Patent [19]

Keller

[11] Patent Number: 5,800,653

[45] Date of Patent: Sep. 1, 1998

[54] PROCESS FOR PRODUCING TUBULAR BODIES

[75] Inventor: Gerhard Keller, Jongny, Switzerland

[73] Assignee: AISA Automation Industrielle SA, Vouvry, Switzerland

[21] Appl. No.: 797,137

[22] Filed: Feb. 10, 1997

[30] Foreign Application Priority Data

Nov. 21, 1996 [EP] European Pat. Off. ............. 96118685

[51] Int. Cl.$^6$ ............. B29C 53/36; B65D 35/10; B65D 35/22

[52] U.S. Cl. ............. 156/203; 156/218; 156/290; 222/94

[58] Field of Search ............. 156/203, 218, 156/69, 290; 222/94; 220/553, 555

[56] References Cited

U.S. PATENT DOCUMENTS 3,528,876  9/1970  von Clavé-Bouhaben et al. ... 156/218 X

FOREIGN PATENT DOCUMENTS 0340657  11/1989  European Pat. Off. ............. 156/218

*Primary Examiner*—Adrienne C. Johnstone
*Attorney, Agent, or Firm*—Collard & Roe, P.C.

[57] ABSTRACT

A process for producing multi-layered tubular bodies, wherein each tubular body has at least one dividing wall extending along its length to form adjacent longitudinal chambers. The process comprises fastening a dividing strip to a foil ribbon in a parallel arrangement to the foil ribbon, and joining the longitudinal edges of the foil ribbon together to form an endless tube. This tube can then be cut to produce multi-layered tubular bodies.

8 Claims, 1 Drawing Sheet

PROCESS FOR PRODUCING TUBULAR BODIES

BACKGROUND OF THE INVENTION

1. Field of the Invention

The invention relates to a process for producing multi-layered tubular bodies with the use of a foil strip having a dividing strip or a section of a dividing strip cut to length fastened thereto. The lateral edges of the foil strip are then joined with each other to form an endless tube.

2. The Prior Art

Such a process is known from co-pending U.S. patent application Ser. No. 08/776,211.

SUMMARY OF THE INVENTION

It is an object of the present invention to improve upon the prior art and to define a process for producing multi-layered tubular bodies, wherein each tubular body has at least one dividing wall extending along its length to form adjacent longitudinal chambers. The process comprises fastening a dividing strip to a foil ribbon in a parallel arrangement to the foil ribbon, and joining the lateral edges of the foil ribbon together to form an endless tubular body. This tubular body is optionally cut to produce a plurality of multi-layered tubular bodies.

The dividing strip can be tubular in shape, or can be comprised of one or more foil strips that are fastened on the foil ribbon. The tube or strips can be fastened in various ways, to create two or more longitudinal chambers extending within the tubular body.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1A:
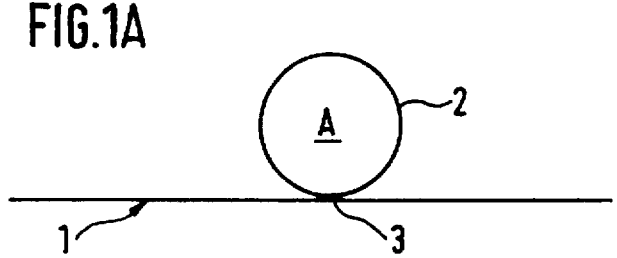
FIG. 1a shows a cross section of an extruded tube, which is fastened at one point on foil strip.
Figure 1B:
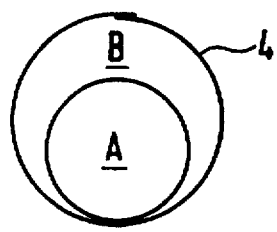
FIG. 1b shows a cross section through a finished tubular body.

Referring now in detail to the drawings and, in particular, FIG. 1, an extruded tube 2, which is seamlessly closed all around, is rigidly arranged by connection 3 on foil ribbon 1, which is made of a known and suitable plastic. The connection can be established by any suitable method, such as by gluing or fusing. After tubular body 4 has been produced by joining the free longitudinal edges of foil ribbon 1, two longitudinal chambers A and B are obtained, as shown in FIG. 1b.

Figure 2A:
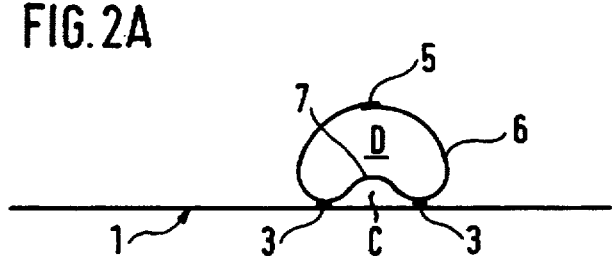
FIG. 2a shows a cross section of a tube with an overlapping seam, which is fastened on a foil strip at two points.
Figure 2B:
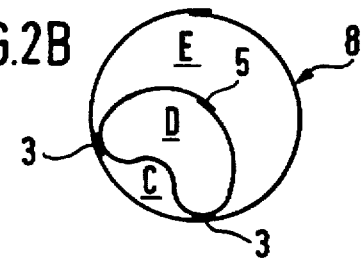
FIG. 2b shows a cross section through a finished tubular body.

In the embodiment shown in FIG. 2, a tube 6 is produced by forming a seam 5, and is fastened on foil ribbon 1 by means of two connections 3, which are spaced from each other. Tube 6 is preferably fastened on foil ribbon 1 so that its section between connections 3 forms a bulging 7. Thus, two longitudinal chambers C and D are easily formed by the arrangement of tube 6 on foil ribbon 1. If the two longitudinal edges of foil ribbon 1 are joined to form tubular body 8, three separate longitudinal chambers C, D and E are thus obtained, as shown in FIG. 2b.

Figure 3A:
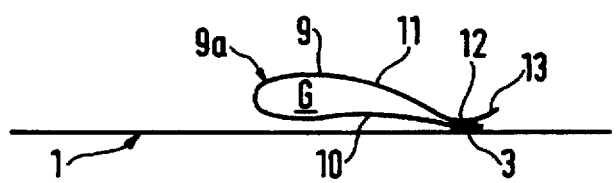
FIG. 3a shows a cross-section of a U-shaped tube, whose free ends are fastened on a foil strip at one point parallel with each other, leaving one free end.
Figure 3B:
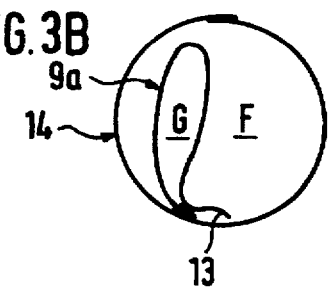
FIG. 3b shows a cross section through a finished tubular body.

In the embodiment shown in FIG. 3, a dividing strip 9 consisting of a known and suitable plastic is arranged on foil ribbon 1 in parallel alignment with foil ribbon 1. Dividing strip 9 is U-shaped and its two legs 10 and 11 have parallel alignment. Legs 10 and 11 are fastened to each other by a connection 12, forming a tube 9a and thus a closed longitudinal chamber G. Preferably, at least one leg 10 or 11 is arranged projecting beyond connection 12, forming a free edge 13. As shown in FIG. 3b, when tubular body 14 is closed by joining the free longitudinal edges of foil ribbon 1, free edge 13 of respective tube 9a, whose free ends support it against the inner wall of tubular body 14, provides tube 9a with a predetermined position within tubular body 14. This makes it possible to center closed dividing strip 9 within tubular body 13. After tubular body 14 has been formed by joining the longitudinal edges of foil ribbon 1, two longitudinal chambers G and F are thus obtained.

Figure 4A:
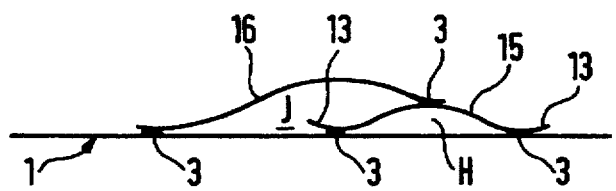
FIG. 4a shows a cross section of two foil strips fastened on a foil ribbon, whereby one foil strip is fastened on the foil ribbon, with the ends left free, and a second foil strip is directly fastened with one end on the foil ribbon, and the other end on the first strip.
Figure 4B:
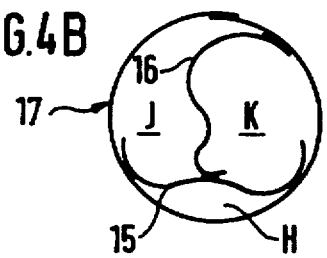
FIG. 4b shows a cross section through a finished tubular body.

FIG. 4 shows a first dividing strip 15 fastened with parallel alignment on a foil ribbon 1 by connections 3, to form free edges 13. A second dividing strip 16 is arranged by connections 13 with its one longitudinal edge on foil ribbon 1 and with its other longitudinal edge on first dividing strip 15, with parallel alignment. In this way, the three longitudinal chambers H, J and K are formed in finished tubular body 17, as shown in FIG. 4b.

Figure 5:
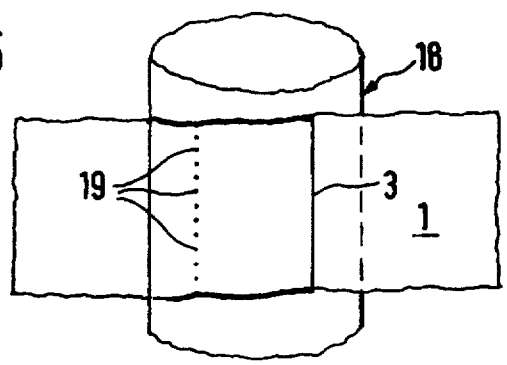
FIG. 5 shows a top view of a tubular body, which is continuously fastened on a foil ribbon section along one line, and fastened at spaced-part points along another line.

FIG. 5 shows a tube section 18, which is fastened on a section of foil ribbon 1 by means of a linear connection 3. However, it can also be fastened by point connections 19, which are arranged linearly and spaced apart.

Instead of a single tube, a plurality of tubes can be arranged on a foil ribbon next to each other. Also, more than two dividing strips that overlap one another can be used.

Several tubes and dividing-wall strips can be arranged on a foil ribbon in such a way that a certain dividing of the longitudinal chambers across the cross section of the tubular body is obtained in the formed, finished tubular body. These elements can be arranged so that practically the entire cross section of the tubular body is filled by longitudinal chambers, whose walls may rest tightly against each other.

Free edges 13 may not only be angled but also pre-shaped, for example, bent or arched, in order to obtain a further alignment or an opening/spreading of the longitudinal chambers formed within the finished tubular body. The tubes produced by a longitudinal seam may have free edges 13 as well.

It can be advantageous, especially in connection with dividing strips, to design edges 13 inwardly folded over and directed at at least one fastening point. This will ensure, through the spring force of edges 13, a forced opening of the longitudinal chamber formed within the finished tubular body.

When fastening one or several tubes and/or one or several dividing strips by two spaced-apart connections, the connections can be arranged so that the tube or dividing strip so fastened rests parallel in the finished tubular body between the connections, or forms a bulging or tendon. In the latter case, the foil ribbon would have to be arched out by partly arranging it in a curved channel.

Accordingly, while only several embodiments of the present invention have been shown and described, it is obvious that many changes and modifications may be made thereunto without departing from the spirit and scope of the invention.

What is claimed is:

1. A process for producing multi-layered tubular bodies, each tubular body having at least one dividing wall extending along its length and forming adjacent longitudinal chambers, comprising:

fastening a dividing strip to a foil ribbon, the ribbon having longitudinal edges, wherein the dividing strip is arranged parallel to the longitudinal edges of the foil ribbon and is tube-shaped; and joining the longitudinal edges of the foil ribbon together to form an endless tubular body, wherein said endless tubular body is optionally cut to produce a plurality of tubular bodies.

2. The process according to claim 1, wherein the dividing strip is an extruded tube.

3. The process according to claim 1, wherein the dividing strip is a foil whose ends are joined with a connection seam.

4. The process according to claim 3, wherein the dividing strip is U-shaped and has two legs, each leg being joined with the other in a parallel position to form a closed tube.

5. The process according to claim 4, wherein at least one free edge projecting beyond the connection seam is formed when the legs are joined together.

6. The process according to claim 5, wherein the at least one free edge is arranged at an angle relative to the surface of the foil ribbon.

7. The process according to claim 1, wherein the fastening of the dividing strip to the foil ribbon occurs along at least one line.

8. The process according to claim 7, wherein the fastening is accomplished using spaced-apart point connections.

* * * * *